United States Patent [19]

Reuschenbach et al.

[11] Patent Number: 5,522,367
[45] Date of Patent: Jun. 4, 1996

[54] METHOD AND DEVICE FOR PREDICTING A FUTURE LOAD SIGNAL IN CONNECTION WITH THE CONTROL OF AN INTERNAL-COMBUSTION ENGINE

[75] Inventors: Lutz Reuschenbach, Stuttgart; Hans Veil, Eberdingen; Christian Koehler, Ludwigsburg, all of Germany

[73] Assignee: Robert Bosch GmbH, Stuttgart, Germany

[21] Appl. No.: 355,722

[22] Filed: Dec. 14, 1994

[30] Foreign Application Priority Data

Jan. 22, 1994 [DE] Germany .................... 44 01 828.2

[51] Int. Cl.$^6$ .................................... F02D 41/04
[52] U.S. Cl. ............................................ 123/492
[58] Field of Search .................... 123/492, 493, 123/480, 478

[56] References Cited

U.S. PATENT DOCUMENTS 5,094,213  3/1992  Dudek et al. ................ 123/478
5,367,462  11/1994  Klenk et al. ................ 123/478

FOREIGN PATENT DOCUMENTS

449851  10/1991  European Pat. Off. .

*Primary Examiner*—Andrew M. Dolinar
*Attorney, Agent, or Firm*—Kenyon & Kenyon

[57] ABSTRACT

In a method and a device for predicting a future load signal (tLPr) in connection with the control of an internal-combustion engine, a crank-angle interval (wPr) is determined from the storage of fuel before use (wEE), from the fuel-injection period (wti), and from the calculation time (wB), expressed in units of time or crank-angle units. The future load signal (tLPr) is then determined from a current main-load signal (tL), a current auxiliary-load signal (tL'), which runs ahead of the current main-load signal (tL), and from the crank-angle interval (wPr). The determination is made using a first-order low-pass filter, whose filter constant (wF) is able to be specified in dependence upon load.

14 Claims, 7 Drawing Sheets

METHOD AND DEVICE FOR PREDICTING A FUTURE LOAD SIGNAL IN CONNECTION WITH THE CONTROL OF AN INTERNAL-COMBUSTION ENGINE

FIELD OF THE INVENTION

The present invention relates to a method and device for predicting a future load signal in connection with the control of an internal-combustion engine.

BACKGROUND OF THE INVENTION

European Patent Application No. EP 449 851 B1 describes a method for determining the amount of fuel to be supplied to an internal-combustion engine per cycle. In the known method, the stationary intake-manifold pressure is calculated from the throttle-valve angle and the engine speed. A recursion formula is applied to determine the intake-manifold pressure expected in the future.

For optimum control of an internal-combustion engine, the air charge of the cylinders of an internal-combustion engine must be known as precisely as possible, to allow metering of an amount of fuel that is adapted exactly to this air charge, and to achieve the desired torque, given low emissions and low fuel consumption. What makes it difficult to optimally meter fuel is that at the moment at which the actual air charge of a cylinder of the internal-combustion engine is known, the fuel metering for this cylinder is already complete. In other words, as a rule, obsolete air charge values are used for the fuel metering. In the case where the air charge does not change or changes only slightly from intake stroke to intake stroke, an optimal or nearly optimal fuel metering can be achieved even with the obsolete values for the air charge. During operating states in which the air charge fluctuates heavily, however, it is more beneficial to adapt the fuel metering to the air charge to be expected at any one time. To this end, a method is needed, which will make it possible to predict with the greatest possible accuracy the air charge of the cylinder into which the amount of fuel will be injected, at the time of calculation of the amount of fuel to be metered.

SUMMARY OF THE INVENTION

The object of the present invention is to render possible an optimum control of the internal-combustion engine. In particular, the aim is to be able to predict the air charge of the cylinders with the greatest possible accuracy.

In the case of the method according to the present invention, a future load signal is determined, which represents the air charge to be expected. The future load signal is determined from a current main-load signal, a current auxiliary-load signal, which runs ahead of the current main-load signal, and from a crank-angle interval. The crank angle interval is able to be specified in dependence upon, expressed in units of time or crank-angle units, the storage of fuel before use, upon the fuel-injection period, and upon the calculation time. The advantage of incorporating the crank-angle interval is that it allows the future load signal to be determined at the latest possible instant, so that a high level of accuracy is achieved.

It is especially advantageous that the future load signal is determined with a low-pass filter, whose filter constant is able to be specified in dependence upon load. In the case of increasing load, the filter constant is read out of a first characteristic curve and, in the case of decreasing load, out of a second characteristic curve.

This makes it possible to determine the air charge in advance while saving considerable computational time.

The auxiliary-load signal is determined from the opening angle of the throttle valve, the speed of the internal-combustion engine, and from an air quantity flowing in some instances through a by-pass duct to the throttle valve, and is corrected in dependence upon the temperature of the inducted air and the barometric level.

In the case of small opening angles of the throttle valve, the auxiliary-load signal can also be determined from the mass air flow detected by a mass air-flow sensor, which, as a rule, leads to a higher accuracy in this operating range.

The main-load signal can be determined, for example, from the measured intake-manifold pressure and the engine speed, from the mass air flow detected with a mass air-flow sensor, or by filtering the auxiliary-load signal.

Another advantage of the method according to the present invention is that it can be used both in transient as well as in steady-state operation, since an auxiliary-load signal that is adjusted to the main-load signal is used to determine the future load signal. The comparison value required for adjusting the auxiliary-load signal is determined by integrating the deviation between the main-load signal and the filtered auxiliary-load signal provided with the adjustment value. The filtered auxiliary-load signal is generated in this case by filtering the corrected auxiliary-load signal.

It is particularly advantageous to use the future load signal to determine the amount of fuel to be injected. In one advantageous exemplary embodiment, even an increase in load, which occurs after the future load signal and the amount of fuel to be injected have been calculated, can still be considered by repeating the calculation for the same injection operation, given at least one later crank angle. When a larger amount of fuel is determined in the later calculation, the original injection period can be prolonged, or an additional injection pulse can be transmitted.

Another variant is even more flexible in that the ascertained amount of fuel is divided between a first and a second injection pulse. The first injection pulse is immediately released. The second injection pulse is corrected in dependence upon the result of a further determination of the future load signal and of the amount of fuel to be injected and, after that, released. In this manner, the amount of fuel originally calculated can also be corrected to smaller values.

DETAILED DESCRIPTION

Figure 1:
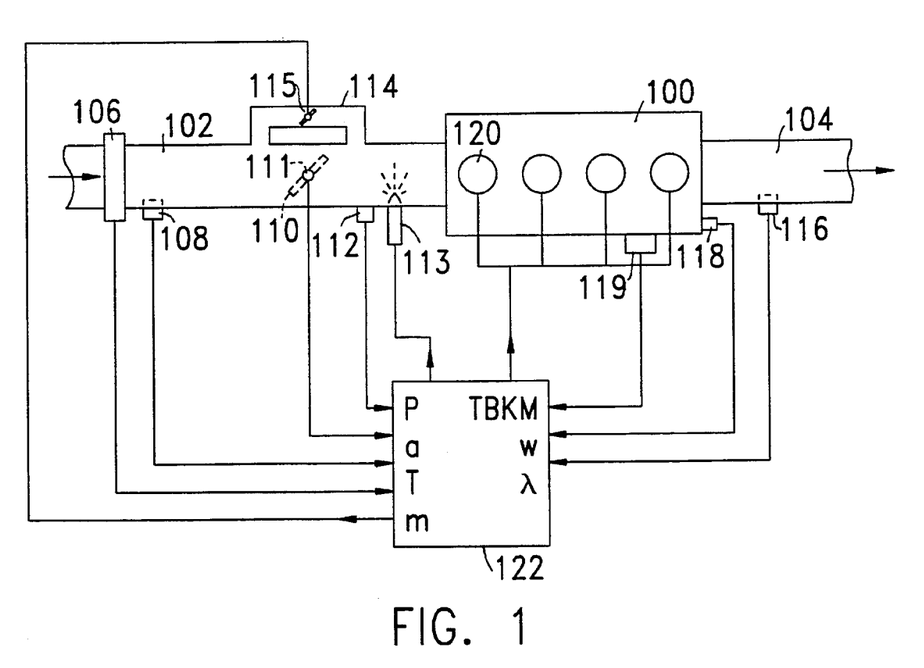
FIG. 1 shows the technical environment in which the present invention is applied.

FIG. 1 schematically depicts an internal-combustion engine 100 and components for controlling the internal-combustion engine 100. By way of an induction section 102, an air/fuel mixture is supplied to the internal-combustion engine 100, and the exhaust gases are given off into an exhaust duct 104. Mounted in the induction section 102—viewed in the direction of flow of the inducted air—are an air—flow sensor or mass air-flow sensor 106, for example, a hot-wire air flow meter, a temperature sensor 108 for detecting the intake-air temperature, a throttle valve 110 with a sensor 111 for detecting the opening angle of the throttle valve 110, a pressure sensor 112, and one or more injection nozzles 113. As a rule, the air-flow sensor or mass air-flow sensor 106 and the pressure sensor 112 are alternatively present.

A by-pass duct 114, in which an idle-speed actuator 115 is arranged, leads around the throttle valve 110. One can eliminate the by-pass duct 114 and the idle-speed actuator 115 when the idling speed is controlled with the help of the throttle valve 110. In some instances, by-pass valves can be additionally provided to ensure an adequate idling speed, for example, when an air conditioning system is switched on. An oxygen sensor 116 is mounted in the exhaust duct 104. A crank-angle sensor 118 and a sensor 119 for detecting the temperature of the internal-combustion engine 100 are mounted on the internal-combustion engine 100. In addition, the internal-combustion engine 100 has, for example, four spark plugs 120 for igniting the air/fuel mixture in the cylinders.

The output signals from the described sensors are transmitted to a central control unit 122. Specifically, these signals are: a signal m from the air-flow sensor or mass air-flow sensor 106, a signal T from the temperature sensor 108 for detecting the intake-air temperature, a signal $\propto$ from the sensor 111 for detecting the opening angle of the throttle valve 110, a signal p from the pressure sensor 112, a signal $\lambda$ from the oxygen sensor 116, a signal w from the crank-angle sensor 118, and a signal TBKM from the sensor 119 for detecting the temperature of the internal-combustion engine 100. The control unit 122 evaluates the sensor signals and triggers the injection nozzle or nozzles 113, the idle-speed actuator 115 and the spark plugs 120.

Figures 2A, 2B:
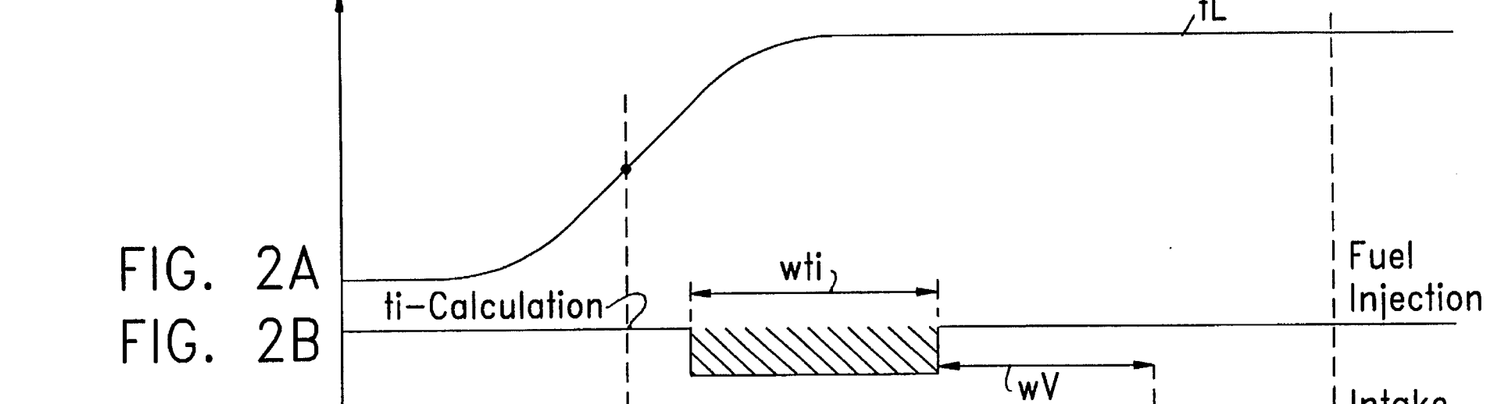
FIG. 2 shows the interrelationship of the load, the fuel injection, and the opening angle of the intake valve of a cylinder in dependence upon the crank angle.
Figure 2C:
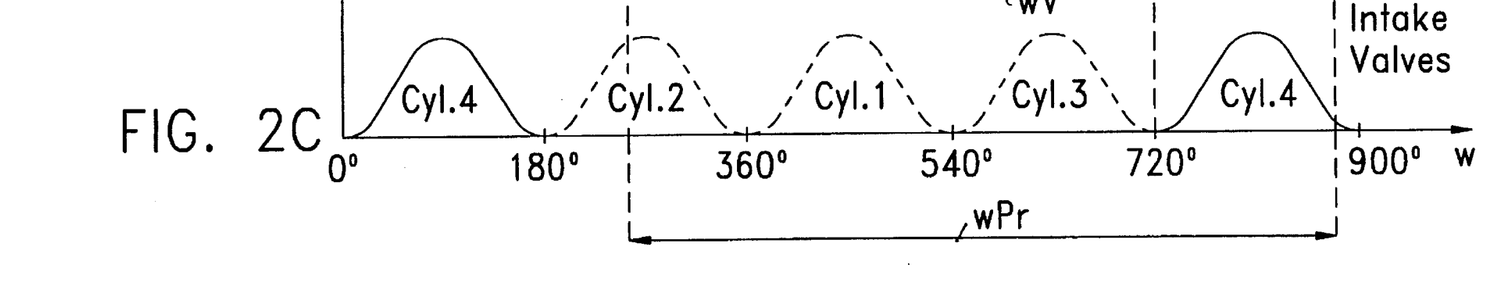

FIG. 2 depicts the interrelationship of the load, the fuel injection., and the opening angle of the intake valve of a cylinder in dependence upon the crank angle w for an internal-combustion engine having four cylinders. The fuel metering for cylinder no. 4 is depicted. The lower solid line indicates the opening angle of the intake valve for cylinder no. 4; the lower dotted line the opening angle of the intake valves of the remaining cylinders. At a crank angle w of 0° the intake valve of cylinder no. 4 begins to open When w=90° the intake valve of cylinder no. 4 is opened to the maximum, and at w=180°the intake valve is closed again After that, the intake valves of cylinders no. 2, no. 1 and no. 3 run through the same opening and closing cycle, in this sequence, and at a crank angle w of 720°, the intake valve of cylinder no. 4 begins to open again.

The curve for the fuel injection for cylinder no. 4 is depicted above the curve for the opening angle of the intake valves. To allow the fuel to arrive properly in cylinder no. 4, the fuel injection must be completed by a storage-before-use angle wV before the intake valve begins to open at w=720°. In the depicted exemplary embodiment, the storage-before-use angle amounts to 180°, so that the injection is complete at a crank angle of 540°. The beginning of the fuel injection is situated before the end of the fuel injection by the crank angle wti. The crank angle wti represents the injection period ti converted into crank angles. In the depicted exemplary embodiment, the fuel injection begins at about 315°. The calculation of the injection period ti takes place once per segment, i.e. every 180° crank angle. Since the calculation of the injection period ti must take place before the beginning of the injection, the calculation for the fuel quantity introduced into cylinder no. 4 in the segment between 720° and 900° crank angle must be made at the latest in the segment between 180° and 360° crank angle. The beginning of the calculation is marked by a vertical, dotted line at about 260° crank angle.

The uppermost curve of FIG. 2 shows the characteristic curve of the main-load signal tL. The main-load signal tL can be determined, for example, from the signal p generated by the pressure sensor 112 and from the engine speed n, or from the averaged and filtered signal m from the mass air-flow sensor 106. The air charging of the corresponding cylinder (in FIG. 2, cylinder no. 4) is required to calculate the injection period. The main-load signal tL is representative of the air charging at a certain crank angle, near the crank angle at which the intake valve of the cylinder closes (in FIG. 2, cylinder no. 4, about 20° before closing of the intake valve at 900°). This particular crank angle is designated in the following as charging angle. The exact value of the charging angle depends on the type of the internal-combustion engine 100 and can be determined empirically, for example.

As described above and as depicted in FIG. 2, the calculation of the injection period must be carried out long before the charging angle. However, the air charging, which is represented by the main-load signal tL existing in the case of the charging angle, is required for the calculation. As a rule, however, the future characteristic curve of the main-load signal tL is not known, since it depends, for example, on the driver's wishes. If the main-load-signal tL that is active at the instant of the calculation is used in the calculation, then this does not lead to an optimal fuel metering where the main-load signal tL changes at any time before the charging angle is reached (see the uppermost curve in FIG. 2), i.e. in transient operation.

The method according to the present invention renders possible a prediction by approximation of the load signal tL existing at the charging angle, which is designated in the following as the future load signal tLPr. What is utilized in particular in this case is that the main factor influencing the characteristic curve of the future load signal tLPr, the opening angle $\propto$ of the throttle valve 111, is known and the signal $\propto$ runs somewhat ahead of the signal tL. More details on this are shown in FIG. 3.

Figure 3:
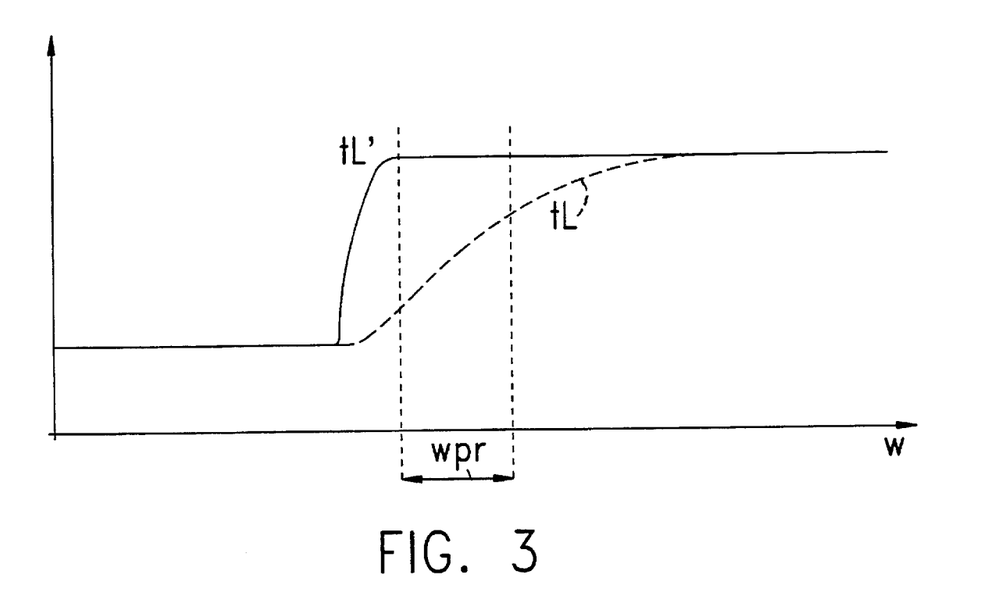
FIG. 3 shows the characteristic curve of the main-load signal and of the auxiliary-load signal in dependence upon the crank angle.

FIG. 3 shows a diagram in which the main-load signal tL (dotted line) and the auxiliary-load signal tL' (solid line) are plotted over the crank angle w. In the steady-state operation, the curves for tL and tL' coincide (on the left or all the way to the right). At the transition from lower to higher load, the curve for tL' rises considerably faster than the curve for tL, so that future values for tL can be predicted from current values for tL' and tL, i.e. the future load signal tLPr can be determined from the current auxiliary-load signal tL' and the current main-load signal tL.

For the determination of the future load signal tLPr, a simple intake-manifold model is taken as a basis, which is described by a first-order low-pass filter having a load-dependent filter constant. In the case of the current crank angle w, the future load signal tLPr existing in the case of the future crank angle w+wPr is predicted in accordance with the following equation:

$$tLPr=tL(w+wPr)=tL(w)+(tL'(w)-tL(w))* (1-\exp(-wpr/wF))$$

Figure 5:
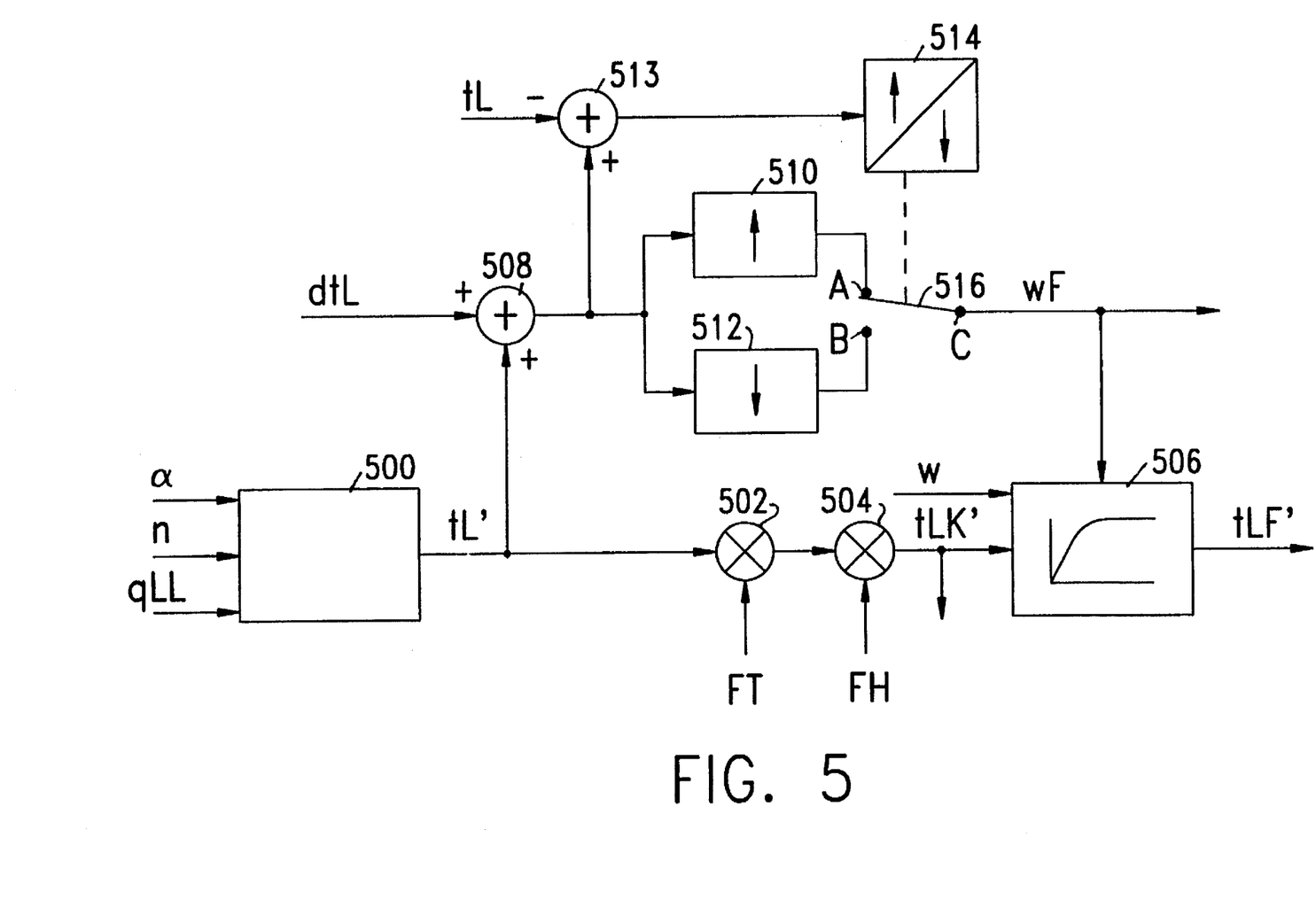
FIG. 5 shows a block diagram for generating the auxiliary-load signal.
Figure 6:
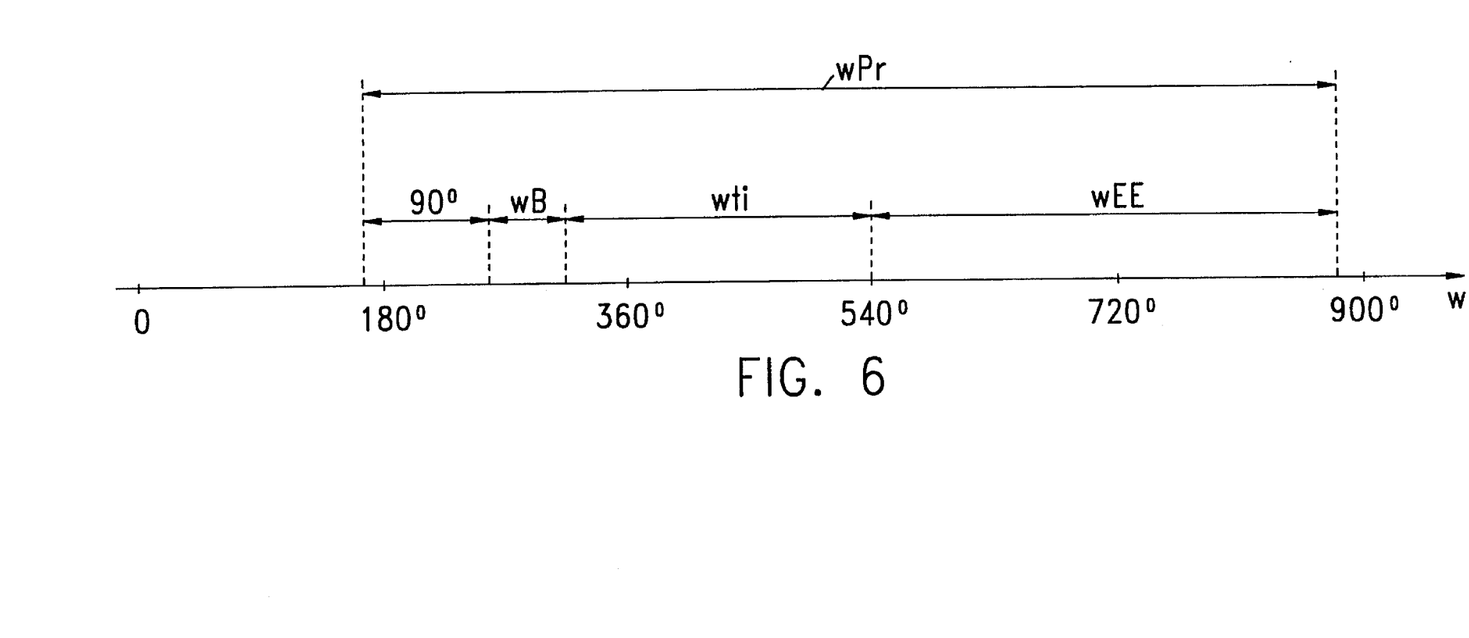
FIG. 6 shows a diagrammatic representation for determining the prediction angle.

In this case, wPr is the prediction angle, i.e., the difference between the future crank angle, for which the future load signal tLPr is predicted—as a rule, this is the charging angle—and the momentary crank angle w. Details for determining the prediction angle wPr are shown in FIG. 6 and are described in the corresponding text. Details for determining the filter constants denoted by wF are shown in FIG. 5 and described in the corresponding text.

Figure 4:
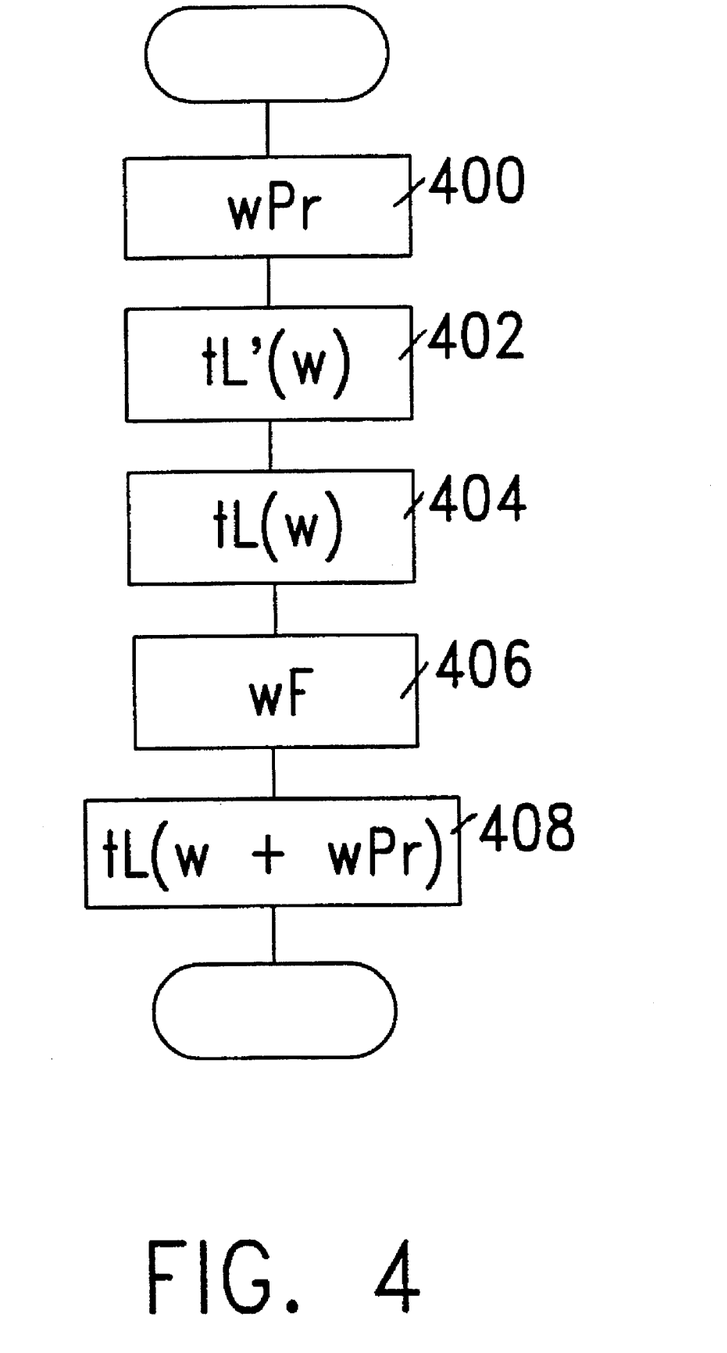
FIG. 4 shows a flow chart depicting the basic functional sequence of the method according to the present invention.

FIG. 4 illustrates a flow chart for the fundamental functional sequence of the method according to the present invention. The prediction angle wPr is determined in a first step 400.. The diagrammatic representation depicted in FIG. 6 shows what is occurring in detail. Step 400 is followed by a step 402, in which the auxiliary-load signal tL' is determined. As shown in FIG. 5, the auxiliary-load signal tL' is determined from a characteristics map, in dependence upon the throttle-valve angle ∝, the engine speed n and, in some instances, upon an air quantity qLL flowing through a by-pass duct 114 and/or additional by-pass valves. Step 402 is followed by a step 404.

The momentary main-load signal tL is determined in step 404. The momentary main-load signal tL can be determined, for example, by filtering the air mass m, which has been measured and averaged over a crank-angle segment, using a first-order low-pass filter. Alternatively to this, the momentary main-load signal tL can also be determined from the intake-manifold pressure p and from the engine speed n, or by filtering the auxiliary-load signal tL'. Step 404 is followed by a step 406, in which the load-dependent filter constant wF is determined.

Figure 7:
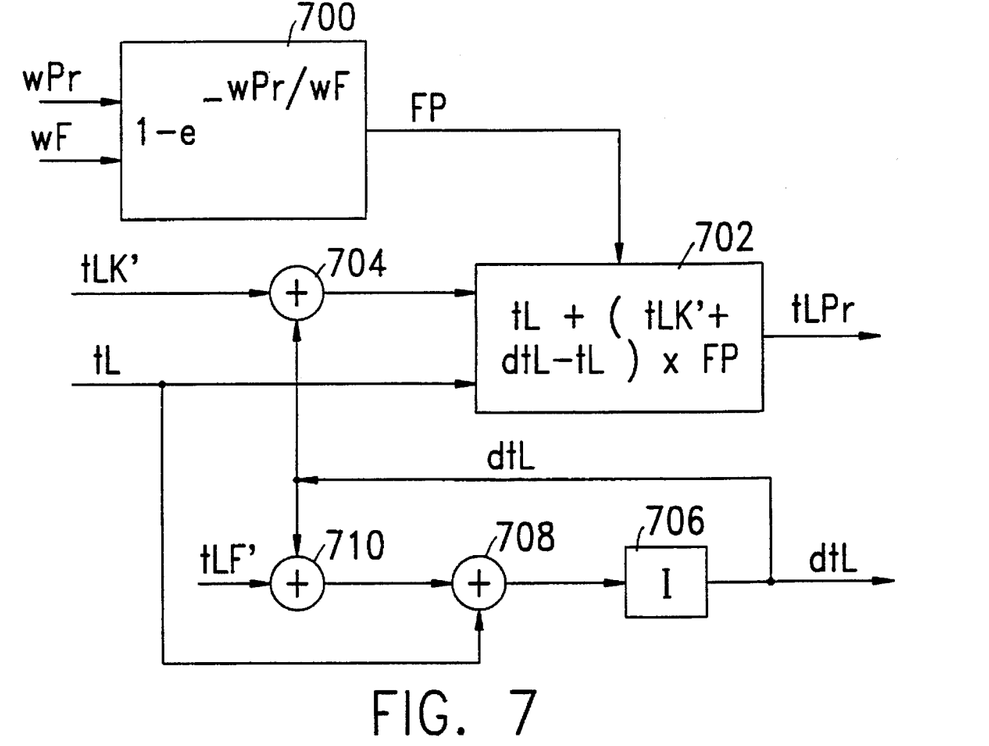
FIG. 7 shows a block diagram for generating the future load signal.

Finally, a step 408 follows. In step 408, the future load signal tLPr=tL(w+wPr) for the crank angle w+wPr is ascertained from the variables determined in steps 400 through 406 in accordance with the equation mentioned further above. To achieve a higher level of accuracy, as a rule, the equation is used in a form that is slightly altered with respect to the main-load signal tL'. More details on this are shown in FIG. 7 and described in the corresponding text. The flow chart cycle is ended with step 408.

FIG. 5 shows a block diagram for determining, correcting and filtering the auxiliary-load signal tL' and for determining the filter constants wF. A signal for the opening angle ∝ of the throttle valve 110, a signal for the engine speed n, and a signal for the air quantity qLL flowing through a by-pass duct 114 and/or additional by-pass valves are injected into a block 500. From these input variables, the block 500 determines an auxiliary-load signal tL' and holds it ready at the output. Reading out of a characteristics map and/or performing a calculation allow the determination to be made.

The output of the block 500 is linked to a first input of a node 502. A correction factor FT dependent upon the (temperature of) air inducted by the internal-combustion engine 100 is injected into the second input of the node 502. The output of the node 502 is linked to a first input of a node 504. A barometrie-level-dependent correction factor FH is injected into the second input of the node 504. The output of the node 504 is linked to a first input of a low-pass filter 506. A signal for the crank angle w, which is generated, for example, by the crank-angle sensor 118 or is calculated from the engine speed n and the time, is applied to a second input of the low-pass filter 506. The crank angle w represents the independent variable of the low-pass filter 506. Often in the case of low-pass filters, the time is selected as an independent variable.

Since in the present case, the process does not proceed as a time-synchronized sequence, but rather as a crank-angle synchronized sequence, the mathematical description is simplified when the crank angle w is selected as an independent variable of the low-pass filter 506. Thus, the filter constant of the low-pass filter 506 is not a time unit, but rather the crank angle wF. The filter constant wF is injected via a third input into the low-pass filter 506. From the corrected auxiliary-load signal tLK', which only correctly reproduces the load in steady-state operating states, the low-pass filter 506 generates a filtered auxiliary-load signal tLF', which also correctly reproduces the load in dynamic operating states. The filtered auxiliary-load signal tLF' can be tapped off from the output of the low-pass filter 506. The low-pass filter 506 can be represented by the following equation:

$$tLF(w2)=tLF(w1)+(tlK'(w2)-tLF(w1)) * (1-\exp((w1-w2)/wF))$$

Here, w1 and w2 represent successive crank angles.

The following describes how the filter constant wF is determined:

A first input of a node 508 is linked to the output of the block 500, i.e. the auxiliary-load signal tL' is injected into this first input. A signal dtL is injected into the second input of the node 508. The signal dtL represents a measure for the deviation between the main-load signal tL and the filtered auxiliary-load signal tLF' and serves to adapt the auxiliary-load signal to the main-load signal. Details pertaining to this and to the determination of the signal dtL are shown in FIG. 7 and described in the corresponding text. Signals tL' and dtL are added in the node 508 and held ready at the output. The output of the node 508 is linked to the input of a characteristic curve 510, to the input of a characteristic curve 512, and to the first input of a node 513. The main-load signal tL is applied to the second input of the node 513. The node 513 subtracts the signal at the second input from the signal at the first input and makes available the difference at the output. The output of the node 513 is linked to the input of a selection stage 514.

The filter constant wF is placed in the characteristic curve 510 for the case that the load rises. The filter constant wF is placed in the characteristic curve 512 for the case that the load decreases. The output of the characteristic curve 510 is connected to a contact A of a switch 516, and the output of the characteristic curve 512 to a contact B of the switch 516. Furthermore, the switch 516 has a third contact C, which can be optionally connected to the contact A or to the contact B. The switch 516 is controlled by the selection stage 514.

In the case that-the selection stage 514 recognizes a rising load (signal at the input of the selection stage 514 >0), then it triggers the switch 516 so as to interconnect contacts A and C, i.e. the contact C is linked to the output of the characteristic curve 510. If, on the other hand, the selection stage 514 recognizes that the load is decreasing (signal at the input of the selection stage 514 <0), then it triggers the switch 516 so as to interconnect contacts B and C, i.e. the output of the characteristic curve 512 is linked to the contact C. It is thus guaranteed that t? he filter constant wF for rising and for falling load is read out of different characteristic curves. The contact C of the switch 516 is connected to the third input of the low-pass filter 506, i.e. the filter constant wE being applied to the contact C is injected into the third input of the low-pass filter 506. Moreover, the filter constant wF is kept in readiness for further applications (see FIG. 7).

FIG. 6 shows a diagrammatic representation for calculating the prediction angle wPr. It is necessary for the prediction angle wPr to be calculated, since the prediction of the future air charging and, thus, of the future load signal tLPr is supposed to be performed as late as possible due to accuracy considerations, and the latest possible instant or crank angle depends, inter alia, on the storage-before-use angle wV and on the injection period ti and, thus, is not constant. An axis for the crank angle w is depicted in FIG. 6, and events are noted on this axis which are significant in conjunction with the determination of the prediction angle wPr. The determination is made by calculating back, starting from the charging angle for which the future load signal tLPr is supposed to be predicted. The first component of the prediction angle wPr results from storage of the fuel before use and from the introduction of the air/fuel mixture into the cylinder, and is designated as wEE. The crank-angle interval wEE is established in accordance with the method known to one skilled in the art, which will not be described in greater detail here.

The injection period ti converted into crank angles is to be considered as a further component wti. Since, however, the injection period ti is first determined after the prediction is made for the future load signal tLPr, the injection period ti of the preceding injection is used. As a third component wB, the time (period) converted into crank angles is to be considered, which is needed to calculate the future load signal tLPr and the current injection period ti. Furthermore, FIG. 6 also depicts a fourth component of 90°, i.e. half of one segment. This fourth component is always to be considered when the main-load signal tL is averaged over one segment. An averaging is to be recommended when the main-load signal tL is determined from a heavily fluctuating signal, for example from the output signal of a hot-wire air flow meter. By adding the components wEE, wti, wB depicted in FIG. 6 and, in some instances, the value of 90°, one obtains the prediction angle wPr FIG. 7 depicts a block diagram for generating the future load signal tLPr. The future load signal tLPr is calculated in a manner similar to that already described in the text pertaining to FIG. 3 and is partially performed in a block 700 and partially in a block 702. The calculation follows in accordance with the following equation:

$$tLpr=tL+(tLK'+dtL-tL)*FP$$

Here, the factor FP is calculated as follows:

$$FP=1-\exp(-wPr/wF)$$

The factor FP is calculated in a block 700. A signal for the prediction angle wPr and a signal for the filter constant wF are injected into the block 700. The output of block 700 is linked to an input of block 702. From the factor FP and other input variables, the block 702 determines the future load signal tLPr in accordance with the above equation and holds this signal in readiness for further processing at its output,. The main-load signal tL is applied to another input of the block 702. The last input Of the block 702 is linked to the output of a node 704. The corrected auxiliary-load signal tLK' output by the node 504 of FIG. 5 is applied to a first input of the node 704. The second input of the node 704 is linked to the output of an integrator 706. At its output, the integrator 706 makes available the signal dtL. The input of the integrator 706 is connected to the output of a rode 708. The main-load signal tL is injected into a first input of the node 708. The second input of the node 708 is connected to the output of a node 710. The node 708 subtracts the signal being applied to the second input from the main-load signal tL, which is being applied to the first input. The filtered auxiliary-load signal tLF' from FIG. 5, block 506, is applied to a first input of the node 710. The second input of the node 710 is linked to the output of the integrator 706, i.e. the signal dtL is injected into the second input of the node 710. The purpose of the integrator 706 and of the two nodes 708 and 710 is to adjust the filtered auxiliary-load signal tLF' and the main-load signal tL to one another.

It is guaranteed in this manner that the filtered auxiliary-load signal tLF' and the main-load signal tL conform in steady-state operation. This presupposes that the prediction of the future load signal tLPr can always be active, i.e. in the steady-state operation as well. Without the adjustment, the danger would exist that the filtered auxiliary-load signal tLF' and the main-load signal tL deviate from one another in the steady-state operation and, consequently, would have to be switched over in dependence upon the operating state between the two load signals. The functioning method of the adjustment corresponds to that of an I-controller, the main-load signal tL representing the setpoint value, the signal dtL representing the manipulated variable, and the sum of the filtered auxiliary-load signal tLF' and the signal dtL representing the actual value.

In the case of the formula applied in block 702 for calculating the future load signal tLPr, the assumption is made that the corrected auxiliary-load signal tLK' does not change any more, i.e. the dynamic operating state is already ended for the throttle valve 110, and the opening angle ∝ of the throttle valve 110 and the engine speed n remain constant. As a rule, this assumption is generally fulfilled. In operating states, in which the rate of change of the opening angle ∝ of the throttle valve 110 assumes a mid-sized value and in which the opening angle ∝ on the whole changes considerably, it can, however, be beneficial to use an extrapolated value for the corrected auxiliary-load signal tLK'. In the simplest case, two successive tLK' signals can be linearly extrapolated for this purpose. The future load signal tLPr can be used for calculating the injection period ti, while the build up and reduction of the wall film are considered in the transient operation. Here, the prediction of the future load signal tLPr can be repeated at a later crank angle than the prediction angle wPr described above. Since the second prediction extends over a smaller crank-angle interval, a greater accuracy can thus be achieved. In the case that the second prediction reveals that the originally determined injection period ti was too short, then the injection period ti can be prolonged or, in the case that the injection was already concluded, but the intake valve is not yet closed, then an additional injection pulse can be transmitted. To be able to still make a correction in the case that too great a fuel quantity was originally determined, one can proceed as follows: The originally calculated injection period is divided into two injection pulses, for example in the ratio 2:1. The longer pulse is immediately started. The shorter pulse is postponed until after the second prediction of the signal tLPr and is corrected on the basis of this second prediction.

In one advantageous exemplary embodiment, a variant is provided in the case of the determination of the filtered auxiliary-load signal tLF' depicted in FIG. 5. In the case of small opening angles ∝ of the throttle valve 110, as a rule, the sensor 111 supplies a very inaccurate signal. Therefore, in this operating range, instead of the corrected auxiliary-load signal tLK', an unfiltered load signal determined with the mass air-flow sensor 106 is injected into the low-pass filter 506. Outside of this operating range, one proceeds as illustrated in FIG. 5.

In another exemplary embodiment, the calculation of the future load signal tLPr and of the injection period ti is performed as an ignition-synchronized calculation. In this case, the prediction angle wPr calculated in accordance with FIG. 6 is used to establish the segment in which the calculation of tLPr and ti is supposed to take place. Within the thus determined segment, the beginning of the calculation is definitively specified.

Contrary to the calculation of the injection pulses, in the case of the calculation of the ignition-advance angle, it is not the future load signal tLPr, but rather the current main-load signal tL that is used.

What is claimed is:

1. A method for controlling an internal-combustion engine, comprising the steps of: predicting a future load signal (tLPr) as a function of: a current main-load signal (tL), a current auxiliary-load signal (tL'), which runs ahead of the current mainload signal (tL), and a crank-angle interval (wPr), the crank-angle interval being dependent upon a storage of fuel before use (WEE), upon a fuel-injection period (wti), and upon a calculation time (wB); and controlling a supply of fuel to the internal-combustion engine as a function of the predicted future load signal.

2. The method according to claim 1, wherein the future load signal (tLPr) is determined with a low-pass filter, the low-pass filter including a filter constant (wF), and further comprising the step of:

specifying the filter constant (wF) in dependence upon load.

3. The method according to claim 2, further comprising the steps of:

reading the filter constant (wF) from a first characteristic curve when there is an increasing load; and reading the filter constant (wF) from a second characteristic curve when there is a decreasing load.

4. The method according to claim 1, wherein the current auxiliary-load (tL') is determined from an opening angle (∝) of a throttle valve, and a speed (n) of the internal-combustion engine.

5. The method according to claim 1, wherein the current auxiliary-load signal (tL') is determined from an opening angle (∝) of a throttle valve, a speed (n) of the internal-combustion engine, and an air quantity (qLL) flowing through at least one by-pass duct to the throttle valve.

6. The method according to claim 1, wherein the current main-load signal (tL) is determined using at least one of a measured intake-manifold pressure (p) and an engine speed (n), a mass-air flow (m) detected using a mass air-flow sensor, and a filtered current auxiliary-load signal (tL').

7. The method according to claim 1, further comprising the step of:

correcting the current auxiliary-load signal (tL') depending upon a temperature (T) of induced air and a barometric level.

8. The method according to claim 7, further comprising the step of:

adjusting the corrected auxiliary-load signal (tLK') to the current main-load signal (tL) using an adjustment value (dtL), when the current main-load signal (tL) is not determined from the current auxiliary-load signal (tL').

9. The method according to claim 8, wherein the adjustment value (dtL) is determined by integrating a deviation between the current main-load signal (tL) and a filtered auxiliary-load signal (tLF') provided with the adjustment value (dtL), the filtered auxiliary-load signal (tLF') being determined by filtering the corrected auxiliary-load signal (tLK').

10. The method according to claim 1, wherein the current auxiliary-load signal (tL') is determined from a mass air flow (m) detected by a mass air-flow sensor, when there are small opening angles (∝) of a throttle valve.

11. The-method according to claim 1, further comprising the steps of:

determining for at least one later crank-angle (w), the future load signal (tLPr) and the amount of fuel to be injected; and one of prolonging the original injection period (ti), and transmitting an additional injection pulse, when a larger amount of fuel is determined for the at least one later crank angle (w).

12. The method according to claim 1, further comprising the steps of:

dividing a determined amount of fuel to be injected between a first injection pulse and a second injection pulse;

releasing the first injection pulse immediately;

correcting the second injection pulse based upon a result of a further determination of the future load signal (tLPr) and of the amount of fuel to be injected; and releasing the corrected second injection pulse.

13. An apparatus for controlling an internal-combustion engine comprising:

a circuit arrangement having means for determining:

a current main-load signal (tL), a current auxiliary-load signal (tL'), which runs ahead of the current main-load signal (tL), a crank-angle interval (wPr) based upon: a storage of fuel before use (wEE), a fuel-injection period (wti), and a calculation time (wB), and a predicted future load signal (tLPr) as a function of the current main-load signal (tL), the current auxiliary-load signal (tL'), and the crank-angle interval (wPr); the circuit arrangement including means for controlling a supply of fuel to the internal-combustion engine as a function of the predicted future load signal.

14. The apparatus according to claim 13, wherein the circuit arrangement includes:

a first circuit for determining the current main-load signal (tL), a second circuit for determining the current auxiliary-load signal (tL'), a third circuit for determining the crank-angle interval (wPr), and a fourth circuit for determining the future load signal (tLPr).

* * * * *

UNITED STATES PATENT AND TRADEMARK OFFICE
CERTIFICATE OF CORRECTION

PATENT NO. : 5,522,367            Page 1 of 2

DATED : June 4, 1996

INVENTOR(S) : Lutz REUSCHENBACH et al.

It is certified that error appears in the above-identified patent and that said Letters Patent is hereby corrected as shown below:

| Column | Line | |
|---|---|---|
| 3 | 9 | Change "air--flow" to -- air-flow --. |
| 3 | 46 | Change "injection.," to -- injection,--. |
| 5 | 4 | Change "...-tL(w))*" to --...-tL(w)) *--. |
| 6 | 48 | Change "that-the" to --that the--. |
| 6 | 57 | Change "t? he" to --the--. |
| 6 | 60 | Change "wE" to --wF--. |
| 7 | 40 | Change "...)*FP" to --...) * FP--. |
| 7 | 52 | Change "output,." to --output,--. |
| 7 | 54 | Change "Of" to --of--. |
| 7 | 60 | Change "rode" to --node--. |
| 8 | 34 | After "purpose." start a new paragraph. |
| 9 | 11 | Before "predicting" start new line and indent. |

UNITED STATES PATENT AND TRADEMARK OFFICE
CERTIFICATE OF CORRECTION

PATENT NO. : 5,522,367

DATED : June 4, 1996

INVENTOR(S) : Lutz REUSCHENBACH et al.

It is certified that error appears in the above-identified patent and that said Letters Patent is hereby corrected as shown below:

| Column | Line | |
|---|---|---|
| 9 | 12 | Before "a current" start new line and indent. |
| 9 | 13 | Before "a current" start new line and indent. |
| 9 | 14 | After "and" start new line and indent. |
| 9 | 18 | Indent "controlling". |
| 9 | 33 | Change "the,current" to --the current--. |
| 10 | 13 | Change "The-method" to --The method--. |
| 10 | 16 | Change "the amount" to --an amount--. |
| 10 | 45 | After "(wPr);" start new sub-paragraph. |

Signed and Sealed this

Twenty-sixth Day of November 1996

Attest:

BRUCE LEHMAN

*Attesting Officer*     *Commissioner of Patents and Trademarks*